Aug. 4, 1925.
R. F. OUTCAULT, JR
1,548,736
BOOK
Filed March 31, 1923    3 Sheets-Sheet 1
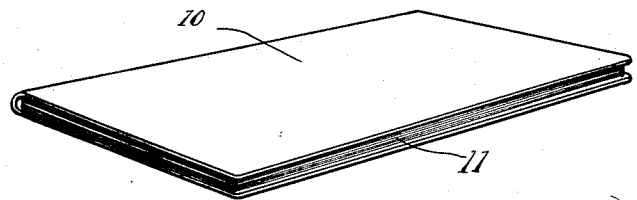
Fig. 1
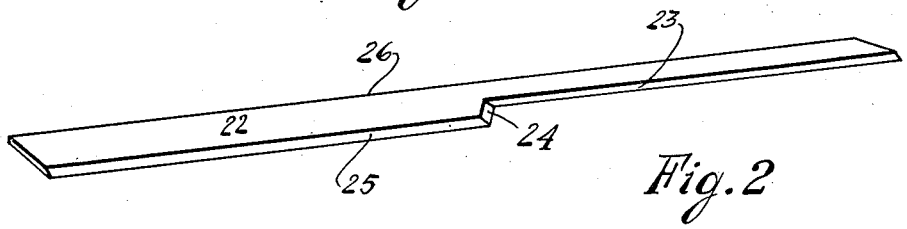
Fig. 2
Fig. 3
Witnesses:
Inventor:
Richard F. Outcault, Jr.
By Joshua R. H. Potts
His Attorney Aug. 4, 1925.

R. F. OUTCAULT, JR 1,548,736

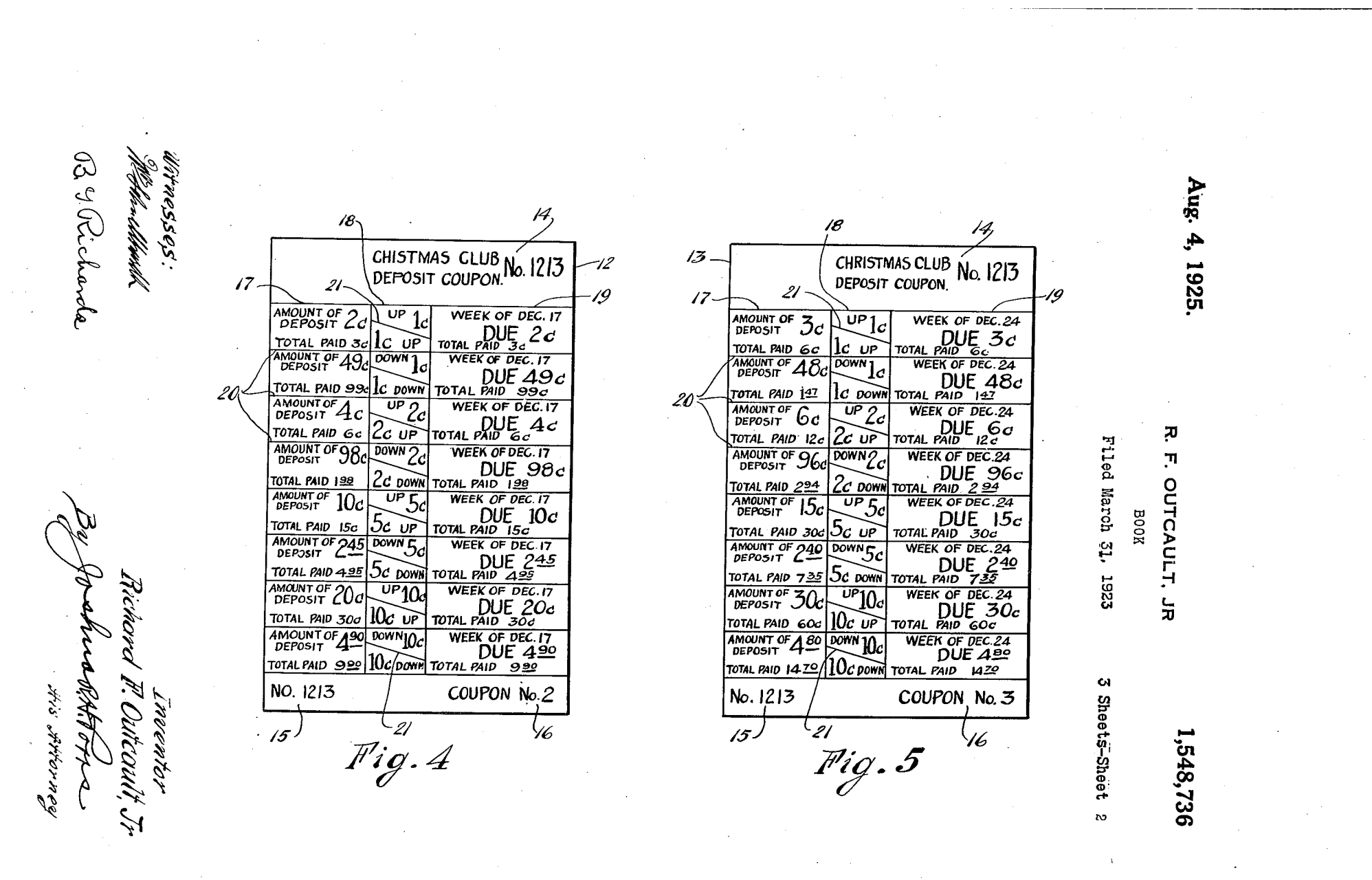

BOOK

Filed March 31, 1923

Figures 6, 7:
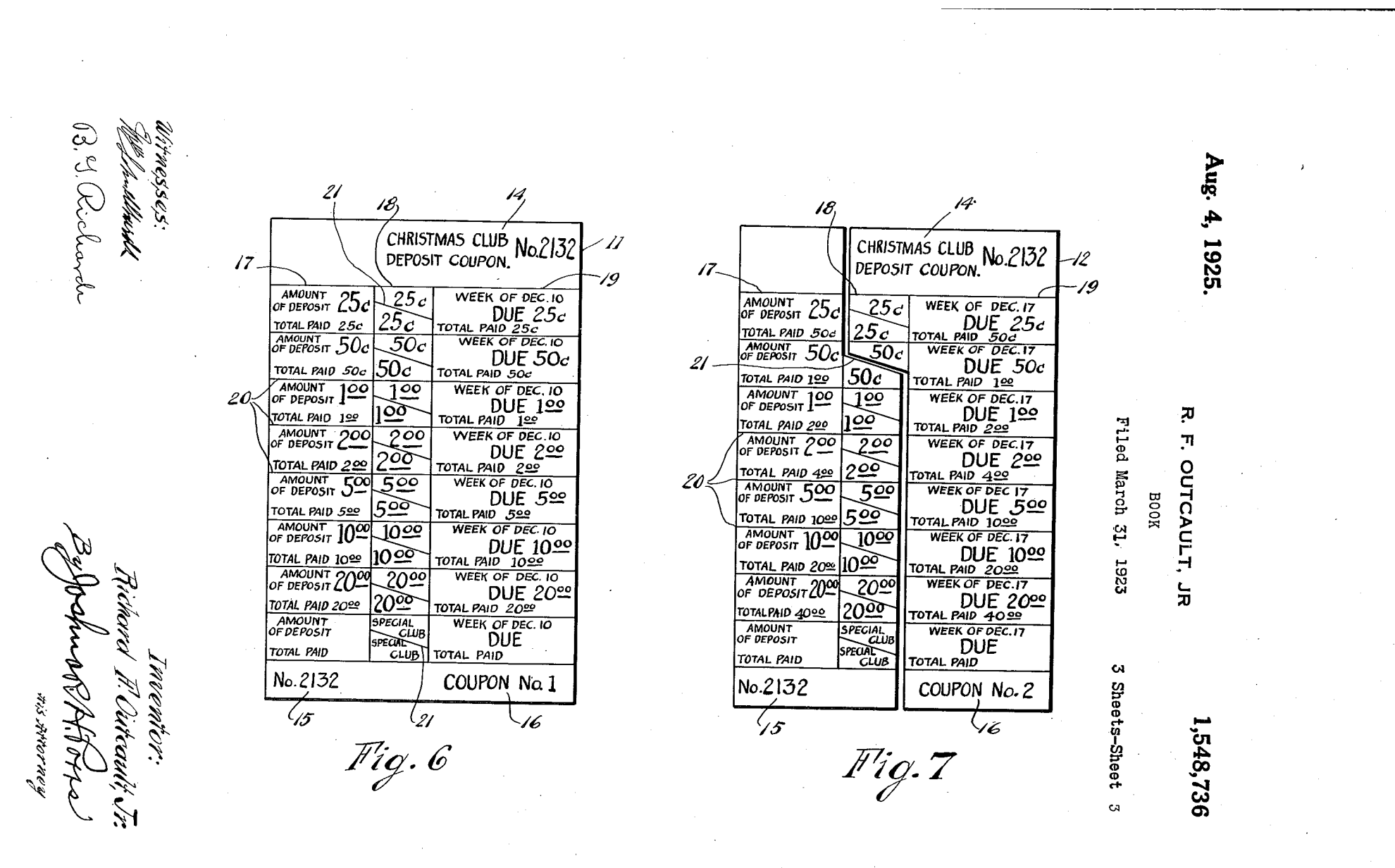

Aug. 4, 1925.  
R. F. OUTCAULT, JR  
1,548,736  
BOOK  
Filed March 31, 1923  
3 Sheets-Sheet 3

Witnesses:

Inventor:
Richard F. Outcault, Jr.
By Joshua R. H. Potts
His Attorney

Patented Aug. 4, 1925.

1,548,736

UNITED STATES PATENT OFFICE.

RICHARD F. OUTCAULT, JR., OF CHICAGO, ILLINOIS.

BOOK.

Application filed March 31, 1923. Serial No. 628,979.

*To all whom it may concern:*

Be it known that I, RICHARD F. OUT- CAULT, Jr., a citizen of the United States, and a resident of the city of Chicago, county of Cook, and State of Illinois, have invented certain new and useful Improvements in Books, of which the following is a specification.

My invention relates to improvements in books, especially adapted for use as bank deposit books and has for its object the provision of a simple and effective book of this character by means of which the depositing and keeping of records of such deposits is greatly facilitated.

Other objects will appear hereinafter.

The invention consists in the combinations and arrangements of parts hereinafter described and claimed.

The invention will be best understood by reference to the accompanying drawings forming a part of this specification, and in which, Fig. 1, is a perspective view of a book embodying the invention;

Fig. 2, is a perspective view of a tearing rule co-operative with said book,

Fig. 3, is a face view of the first sheet of said book, Figs. 4 and 5, are face views of the second and third sheets of said book, Fig. 6, is a face view of the first leaf of a different kind of book, and Fig. 7, is a similar view of the second leaf of said different kind of book but showing the leaf severed into a stub and coupon.

The form of construction illustrated in Figs. 1 to 5, inclusive, comprises a book 10 composed of a plurality of leaves 11 bound together between suitable covers as indicated, there being one of the leaves of said book for each contemplated deposit to be recorded therein. Each leaf 11 is provided at its upper outer portion with a descriptive marking 14 printed thereon and provided with a distinctive number as shown, said number being the number of the bank account or deposit in conjunction with which the book is to be used. At the bottom each leaf is provided at its inner lower edge with the same identification number 15 and at its outer lower edge with the coupon number 16, the different leaves being provided consecutively with coupon numbers as indicated. Thus the first leaf of the book will be numbered as coupon No. 1, the second leaf as coupon No. 2, and the third leaf as coupon No. 3.

Each leaf is also divided into an inner vertical column 17 an intermediate vertical column 18 and an outer vertical column 19. Horizontal lines 20 divide said columns into transversely registering and corresponding subdivisions as shown. The various subdivisions in the inner column 17 are printed to indicate individual bank deposits and also totals. Thus the uppermost subdivision in this column is printed to indicate the deposits of one cent, and this being the first deposit also a total of one cent. The second subdivision is printed to indicate the deposit of fifty cents and also a total paid of fifty cents, and so on down, the various subdivisions being printed to indicate a different individual deposit and total paid.

The corresponding subdivisions in the outer column 19 are printed to indicate the amount due and total paid to correspond with the transversely registered subdivisions in the inner column, and also with the date due.

The subdivisions in the intermediate column 18 are again each subdivided by a transversely inclined line 21 and both above and below said line the amount of the corresponding individual deposit is printed and also an indication of the character of the account. Thus the uppermost subdivision in this column is printed with the word "Up" on each side of the line 21 and the next subdivision in this column with the word "Down" on each side of the dividing line, the former being designed for use in a gradually increasing account and the latter in a gradually decreasing account.

The succeeding pages of the book are correspondingly divided into columns and subdivisions and the corresponding subdivisions are correspondingly printed in accordance with the character of the account indicated on the first leaf. Thus the uppermost subdivisions on leaf 2 are printed to indicate that two cents is deposited and two cents due on December 17th, with a total of three cents paid including the amount represented by the corresponding subdivisions on the first page, and so on throughout the book the corresponding subdivisions on the different leaves of the book being printed in a related series so that each indicates the proper amount of an individual deposit on a given date and also the total equal to the sum of it and all preceding subdivisions. The second leaf of this book is shown in Fig. 4 and the third leaf in Fig. 5, the same system there indicated being followed throughout the removing of the leaves of the book, there generally being fifty leaves in such a book.

I also provide a suitable tearing rule 22 having a bevelled or sharpened tearing edge to correspond with the outer line of the column 17, the inner line of the column 19, and the transversely inclined line 21 of the various subdivisions in column 18, the edge 23 corresponding with the first, the edge 25 corresponding with the second and the intermediate edge 24 corresponding with the third line.

The free edge 26 of the rule is made straight and the various widths of the rule are equal substantially to the distance between said lines from the binding of the book.

By this arrangement when the various deposits are made the bank clerk receiving the same simply lays the rule 22 on the various leaves of the book in proper position to bring the inclined edge 24 thereof in registration with the transversely inclined line 21 in the subdivisions corresponding with the amount which is being deposited, and then tears off the outer portion of the leaf along the edge thus established to constitute a deposit coupon which at once indicates the amount deposited, the amount of the individual deposit on the date indicated and also the total deposited, the transversely inclined line of severance identifying the subdivision giving the amount deposited. If desired, and before the severance, the bank clerk may also stamp the leaf suitably for proper authentication. The outer coupon thus severed is retained by the bank for making up its record and the book returned to the depositor, the severed coupon furnishing a complete record of that and all previous deposits. By this arrangement the accurate recording of the deposits may be very quickly and accurately attained, any mistakes made being at once discovered by reason of the fact that the coupons removed from the book will not correspond or register with each other in case of error.

The forms of leaves illustrated in Figs. 6 and 7 are for uniform deposits of a certain amount each week, a blank subdivision being provided at the bottom to permit of special entries in case a variable amount is deposited in an account not indicated on the other subdivisions. Otherwise the book is identical with the one already described and the printing and operation is the same.

By the use of the two different forms of books practically every desirable form of bank deposit in small and regular amounts is provided for. It will of course be possible to combine both sets in one book by providing a considerable number of subdivisions properly marked on each leaf of the book but it is thought that such an arrangement will unduly increase the size of the book or decrease the size of the subdivisions, and consequently of the printing so as to render the same undesirable.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. A bank deposit book comprising a plurality of leaves each subdivided into a plurality of subdivisions, the subdivisions on each leaf representing different sums deposited and the subdivisions on the different leaves representing related series of deposits, substantially as described.

2. A bank deposit book comprising a plurality of leaves each subdivided into a plurality of corresponding subdivisions, the subdivisions on each leaf representing different sums deposited and the corresponding subdivisions on the different leaves representing related series of deposits, substantially as described.

3. A book comprising a plurality of leaves, each leaf being divided into an inner, outer, and an intermediate column, said columns being subdivided into a plurality of transversely registering subdivisions, the subdivisions of the inner and outer columns being corroboratively marked to indicate an individual deposit and also a total, the corresponding subdivisions on the different leaves constituting a related series in which the total on each succeeding subdivision equals the sum of the individual deposits on the corroborating preceding subdivisions, the subdivisions of the intermediate column being centrally divided by a transversely inclined line and bearing the corresponding individual deposit both above and below said line, substantially as described.

4. A deposit leaf divided into an inner, outer and an intermediate column, the inner and outer columns bearing corroborative markings indicative of different individual deposits and of totals, the intermediate column having duplicate markings indicative of the same individual deposits and having a separating line between the duplicate markings, substantially as described.

5. A deposit leaf divided into an inner, outer and an intermediate column, transverse lines dividing the columns into registering subdivisions, the registering subdivisions of the inner and outer columns bearing corroborative markings indicative of different individual deposits and of total deposits, the intermediate column having duplicate markings in each registering subdivision and having a separating line between the duplicate markings, substantially as described.

6. A book containing a series of leaves correspondingly numbered each leaf being divided into an inner, outer and an intermediate column, the inner and outer columns bearing corroborative markings indicative of different individual deposits and of totals, the intermediate column having duplicate markings indicative of individual deposits and having a separating line between the duplicate markings, the series of leaves constituting a related series in which each total represents the sum of deposits, substantially as described.

7. A book containing a series of leaves correspondingly numbered each leaf being divided into an inner, outer and an intermediate column, transverse lines dividing the columns into registering subdivisions, the registering subdivisions of the inner and outer columns bearing corroborative markings indicative of different individual deposits and of total deposits, the intermediate column having duplicate markings in each registering subdivision and having a separating line between the duplicate markings, the subdivisions of each leaf and of the series of leaves constituting a related series in which each total represents the sum of the preceding subdivisions, substantially as described.

In testimony whereof I have signed my name to this specification in the presence of two subscribing witnesses.

RICHARD F. OUTCAULT, Jr.

Witnesses:
  JOSHUA R. H. POTTS,
  FREDA C. APPLETON.